Dec. 10, 1940.  E. D. TILLYER ET AL  2,224,168
ABRADING DEVICE
Filed June 24, 1938
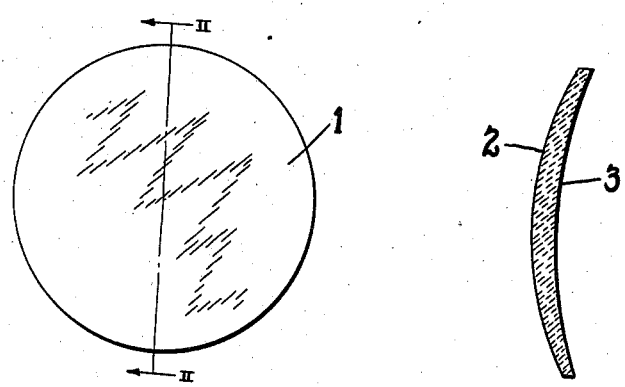
Fig. I  Fig. II
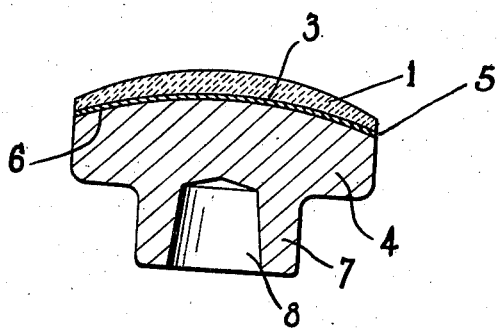
Fig. IV  Fig. III
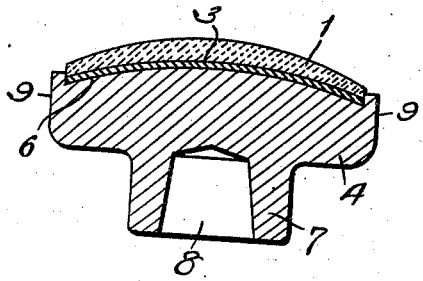
INVENTOR.
EDGAR D. TILLYER
HAROLD R. MOULTON
BY Harry H. Styll
ATTORNEY.

Patented Dec. 10, 1940

2,224,168

UNITED STATES PATENT OFFICE 2,224,168

ABRADING DEVICE

Edgar D. Tillyer and Harold R. Moulton, Southbridge, Mass., assignors to American Optical Company, Southbridge, Mass., a voluntary association of Massachusetts Application June 24, 1938, Serial No. 215,597

2 Claims. (Cl. 51—278)

This invention relates to improvements in abrading devices and has particular reference to improved means and methods of supporting work to be abraded.

One of the principal objects of the invention is to provide improved means and methods of blocking articles formed of resinous material, which will avoid injuring a highly polished finished surface on the side of the article adjacent to the block.

Another object of the invention is to provide improved means and methods of blocking lenses having the above characteristics whereby the lenses may be quickly and easily positioned on the holding means and are readily removable without being injured.

Another object of the invention is to provide a method of blocking lenses having the above characteristics whereby the surface engaging the block or holding means is protected against injury during the blocking operation.

Another object is to provide a tight seal between the lens or article and its supporting means to prevent infiltration of abrasives during the abrading operations.

Another object of the invention is to provide novel means for use in securing the lenses or articles to their holding means whereby the coefficient of expansion of said means may be controlled and has particular reference to the method of making the same.

Other objects and advantages of the invention will become apparent from the following description taken in connection with the accompanying drawing and it will be apparent that many changes may be made in the details of construction, arrangement of parts and methods shown and described without departing from the spirit of the invention as expressed in the accompanying claims. We, therefore, do not wish to be limited to the exact details of construction, arrangement of parts and methods shown and described as the preferred forms only have been given by way of illustration.

Referring to the drawing:

Fig. I is a front elevation of an article to be blocked;

Fig. II is a sectional view taken as on line II—II of Fig. I; and

Fig. III is a sectional side elevation of the device in Fig. I shown in secured relation with its holding means.

Fig. IV is a view generally similar to Fig. III illustrating a modified form of the invention.

Lenses formed of material having roughly the characteristics of polymeric methyl methacrylate have all the desirable characteristics of glass as regards transparency, index of refraction and so forth, but such lenses do not possess hardness and resistance to attack by the common adhesive compounds in general use in blocking ophthalmic lenses. Such compounds, in the past, have been of the characteristics of pitch or rosin which, although particularly desirable for use in blocking glass lenses, have been found to attack the polished surfaces of lenses formed of polymeric methyl methacrylate, this attack being in the nature of a solvent action which would destroy the optical characteristics of the finished lens. This attack is activated by the fact that such adhesives are applied in a heated condition and lenses formed of resinous materials of the nature described would have their surfaces marred by the heat as well as by the solvent action.

It, therefore, is one of the primary objects of this invention to avoid the above difficulties by providing means and methods of blocking such lenses whereby the said lenses may be quickly attached to their holding means and danger of injury thereto obviated.

Referring more particularly to the drawing wherein like characters of reference designate like parts throughout the several views the device embodying the invention comprises a lens 1, formed of polymeric methyl methacrylate or of similar artificial resins or resinoids, which is provided with opposed optical surfaces 2 and 3 of such curvatures that when combined will result in the prescriptive characteristics desired of the finished lens. The surfaces 2 and 3 are preferably formed on said material by grinding and polishing through the use of means and methods similar to those used in forming glass lenses. The abrading operation is performed by the use of a suitable abrading tool having a surface thereon of a curvature desired to be formed on one side of the lens and through the use of rough and successively finer abrasives used in the art in forming a finely ground surface of the curvature of the shape of the tool. This finely ground surface is subsequently polished by the use of rouge or other polishing ingredients commonly used in the art in finishing such surfaces.

The lens 1 is secured to the block or holding means 4 by an intermediate layer 5 of adhesive of a waxy nature. The lens is preferably first provided with a coating of said adhesive as by spraying, brushing or dipping to form a thin coating thereon. The face of the block or holding means 4 is likewise provided with a similar coating. The lens 1 is then pressed firmly in contact with the block or holding means 4. The material used is preferably a pure bleached bees-wax and care is taken that the said wax is heated to a temperature which will not in any way injure the finished surface on the lens. This temperature being preferably below 60° C. and only such as to render the said bees-wax workable.

During the abrading operations and during the finish polishing operations care is taken that the lens is properly lubricated to avoid generation of excess heat. This is to avoid having the bees-wax become softened to a state whereby the lens will move relative to the block.

The plasticity of the bees-wax may be varied within desirable limits by a variety of means as follows:

1. There may be incorporated in the bees-wax discreet finely divided particles of the resin itself so that the wax serves as the carrier of the particles which themselves make up the chief constituent of the supporting material. In this way the coefficient of thermal expansion will be substantially that of the resin itself depending upon the amount of resin used.

2. Fibrous materials, such as wood flour, cotton linters or the like, may be mixed in the wax in proportions of 10% or more of the total amount of wax used.

3. Blends of various waxes, such as carnauba, candelilla and so forth, may be incorporated with the bees-wax and may in addition contain the solid materials referred to above. The reason for the addition of these waxes is to produce a waxy composition having a somewhat higher softening temperature for use during hot weather.

We have found that it may be desirable to protect the surface of the glass by applying a layer of rubber latex, wax emulsion, or mixtures of latex and wax emulsions as soon as the polishing operation has been completed, to protect the lens surface during the handling, incident upon the subsequent blocking operation. This protective coating may be allowed to remain on the surface during blocking or may be removed therefrom just prior to said blocking. In the instances wherein the layer of latex is allowed to remain on the surface of the lens being blocked the pre-coating of said surface with a layer of wax may be omitted if desired.

Another method of blocking consists in the formation of a sheet of wax which is laid upon the supporting means 4, and the lens 1 is then pressed firmly thereon so as to bring the whole assembly into binding relation with each other. This may be done at room temperatures or temperatures slightly above room temperatures but below the melting point of the wax used.

The lenses may be removed from the block by emersing them into a bath of a solvent which will dissolve or soften the wax but which will have no effect upon the resinous material of the lenses. Such baths may be as follows:

If the lens is formed of a material having the characteristics of Bakelite, a bath of xylene, toluen, benzol or the like may be used to remove the lens from the block.

If the lens is formed of methyl methacrylate we have found that iso-propyl alcohol is effective in removing the wax without injury to the resin.

If the lens is formed of urea-formaldehyde or the like the same solvents may be used as for Bakelite.

It is to be understood that the above solvents are set forth only by way of illustration and that any desirable known solvents might be used which will dissolve or soften the wax and which will not injure the material of the lens, the said solvents being selected according to the nature of the material used in forming the lens.

The block or holding means 4 may be formed of metal, Bakelite or other desirable materials and is provided with a surface 6 shaped substantially to the shape of the adjacent finished surface of the lens which is to be secured thereto. This block is of the conventional type used in the ophthalmic art and has an attaching stem 7 with a tapered opening 8 therein adapted to fit upon the spindle of a conventional abrading machine.

Prior to removing the lens 1 from the block after the desired surface has been formed thereon said surface may be provided with a protective coating of rubber latex, wax emulsion or mixtures of latex and wax emulsion as desired and as previously mentioned above. After the said lens has been removed from the block and the adhesive has been cleansed from the surface, as by the use of any of the above mentioned solvents, the said surface may be provided with a protective coating of latex, etc., as mentioned above. These protective coatings may be allowed to remain on the lens until the said lens has been edged and formed to the contour shape desired as is usual in the ophthalmic art.

The lens may be pressed firmly into engagement with the block 4 by the use of a tool which will have a surface thereon of substantially the shape of the exposed surface of the lens and which will substantially engage the entire area of said lens. This will avoid distorting of the lens during the blocking operation.

It is to be understood that any other desirable means and methods may be used in pressing the lens into engagement with the adhesive means on the block.

The blanks may, if desired, be preformed to give standard contour shapes and sizes, in which instance, the block may be provided with mechanical means such as an integral lip 9 or a plurality of spaced projections throughout the contour of the block for holding the said lens against lateral displacement during the abrading and polishing operations. The height of the lip above the face 6 of the block will be such as to allow the tool used in abrading the exposed surface of the lens free movement over said surface and permit the said tool to remove the desired amount from said surface to reduce the lens to a given minimum thickness.

As previously stated above the tools used in performing the abrading or polishing operations, and the machines utilized in performing said operations may be of the conventional type used in abrading lenses in the ophthalmic art.

From the foregoing description it will be seen that simple, efficient and economical means and methods have been provided for blocking resinous articles such as lenses for the performing of abrading operations thereon wherein the danger of injury to the finished surfaces on said lenses is obviated.

Having described our invention, we claim:
1. A device for use in supporting lenses, during the abrading thereof, which are formed of material having the characteristics of methyl methacrylate comprising a holder having a lens supporting surface of substantially the same radius of curvature as a finished surface of the lens to be supported, and adhesive means, of a composition containing bees-wax and discreet finely divided particles of resinous material which make up the chief constituent of said adhesive, on said lens supporting surface and in holding relation therewith and with the finished surface of the lens to be supported, said composition having a softening temperature which is lower than that of the methyl methacrylate and adhesive characteristics which will not destroy or alter the surface quality or other optical characteristics possessed by said lens surface with which it engages, during the holding and abrading of said lens.

2. A device for use in supporting lenses formed of material having characteristics similar to methyl methacrylate during the abrading thereof comprising a holder having a lens supporting surface, and adhesive means, of a waxy composition, on said lens supporting surface and in holding relation therewith and with a finished surface of the lens to be supported, said waxy composition comprising a mixture of wax and fibrous materials in proportions of 10% or more of the total amount of wax used, said waxy composition having a softening temperature which is lower than that of methyl methacrylate and having adhesive characteristics which will not alter the surface quality or other optical characteristics possessed by the finished optical surface of said lens prior to being supported by said supporting surface, during the holding and abrading of said lens.

EDGAR D. TILLYER.
HAROLD R. MOULTON.